United States Patent [19]

Tae-Ho

[11] Patent Number: 4,712,510
[45] Date of Patent: Dec. 15, 1987

[54] EXPANDABLE WAND PET TOY
[75] Inventor: Suh Tae-Ho, Osaka, Japan
[73] Assignee: Fritz Chemical Company, Dallas, Tex.
[21] Appl. No.: 890,039
[22] Filed: Jul. 28, 1986
[51] Int. Cl.⁴ .............................................. A01K 15/02
[52] U.S. Cl. ..................... 119/29; 273/58 C
[58] Field of Search ............. 119/29, 29.5; 273/26 E, 273/58 C, 185 C, 185 D; 272/78

[56] References Cited

U.S. PATENT DOCUMENTS

| | | | |
|---|---|---|---|
| 892,388 | 7/1908 | Aumann | 272/78 |
| 1,699,308 | 1/1929 | Postings | 119/29 |
| 1,890,696 | 12/1932 | Rosenhahn | 272/78 |
| 2,194,736 | 3/1940 | Bruler | 119/29.5 |
| 2,707,937 | 8/1955 | Herman | 119/29 |
| 2,833,244 | 5/1958 | Bohlman | 119/29 |
| 3,114,546 | 12/1963 | Verseghy | 273/38 C |
| 3,216,723 | 11/1965 | Galezniek | 273/26 E |
| 3,295,499 | 1/1967 | Manchester | 119/29 |
| 3,333,847 | 8/1967 | Pennington | 273/26 E |
| 3,397,885 | 8/1969 | Nash | 273/26 E |
| 3,542,364 | 11/1970 | Gaumond | 272/78 |
| 3,727,583 | 4/1973 | Muraro | 119/29 |
| 4,499,855 | 2/1985 | Galkiewicz | 119/29 |

Primary Examiner—Paul J. Hirsch
Attorney, Agent, or Firm—Stanley R. Moore

[57] ABSTRACT

A pet toy comprising a stuffed play object disposed at the end of a tether secured to a flexible telescoping wand. The telescoping wand is constructed with a plurality of segments, the smallest segment having an aperture formed in the distal end for connecting to the tether and the larger segment having a centrally disposed threaded bore for securement of a suction cup. The wand may be secured to any vertical surface such as a door, wall or refrigerator with the suction cup whereby the flexible telescoping wand extends outwardly therefrom with the stuffed pet toy dangling therebeneath. A bell may also be attached to the wand or tether to further facilitate pet interaction.

5 Claims, 3 Drawing Figures

EXPANDABLE WAND PET TOY

BACKGROUND OF THE INVENTION

1. Field of the Invention

The present invention pertains to pet toys and, more particularly, to a flexible telescoping wand, and tether array for support of an object for pet interaction.

2. History of the Prior Art

The prior art is replete with devices and toys for pet interaction and play. Such devices have included replicas of animals and figures which are typically the object of interest for a particular pet. Synthetic bones, for example, have previously been popular for canine entertainment. The bones often include coloring to resemble meat like substances. Replicas of "T-bone steaks" made of suitably durable material for owner/pet interaction have been popular because the fragility of a normal animal bone ordinarily result in quick destruction and consumption by the animal. The synthetic toy can provide hours of entertainment.

As set forth above, the use of synthetic materials for the fabrication of replicas of animals and objects normally sought by pets has found widespread acceptance. Cat toys have included replicas of small rodents which are constructed of lightweight material, often with a "fuzzy" appearance and sufficiently durable to withstand the immediate attack by the animal. In many instances the toy may be tethered for dangling or pulling by the owner during play. This type of owner/pet interaction is quite similar to the age old illustration of a ball of yarn exposed for play with a cat. It is widely known that cats prefer to "toy" with their prey, and the tethering of a soft fuzzy object such as a ball of yarn to a tether in and of itself provides a medium for the cat to manifest its animal instincts in a playful manner.

More conventional animal toys have included combinations of plastic and synthetic fibers for creation of objects particularly adapted for a certain pet's animal instincts. In the case of cats, stuffed toys in shapes of cubes, spheres, rodents and nondescript furry assemblages have found widespread acceptance. In some instances the objects are tethered for support by the owner whereby the object may be pulled across the floor in front of the pet for "toying" with the animal. While it is oftentimes fun to entertain a pet by dangling the toy before the animal, such events are not always opportune relative to an owner's desire for pet interaction. It would therefore be an advantage to provide a pet toy that could be utilized the pet with many of the advantageous aspects of owner/pet interaction such as the movement and toying motions, noises and appearances without the presence of the owner. To accomplish such a feat would require the object to both move in both an up and down and side-to-side manner and often in a "jerky" motion. The configuration of the object would of course, have to vary to maintain the pet's interest over a prolonged period of time. This is particularly true of cats and the like.

The present invention overcomes the problems of the prior art by providing such a pet interaction object disposed at the end of the tether secured to a flexible, telescoping wand. The wand is adapted for being held by the owner for direct interaction with the pet or for coupling to a suction cup for mounting upon a smooth, vertical wall such as a window or refrigerator door to allow the cat to toy with the object in the absence of the owner's presence. To further enhance the interaction, the tether may be elastic and a bell may be secured to the wand.

SUMMARY OF THE INVENTION

The present invention pertains to an expandable wand pet toy comprising a tethered object adapted for play by a pet. More particularly, one aspect of the invention includes a pet toy comprising telescoping wand including a plurality of telescoping sections adapted for retraction one into the other. At lease one of the sections is substantially rigid in a longitudinal direction for providing structural rigidity to the wand structure. A second of the telescoping wand sections is substantially flexible for permitting deflection thereof by pet interaction therewith. Means are provided for mounting the wand to a vertical surface. A pet interaction objected adapted for suspension from a distal end of the wand is secured to a tether attached to a distal end of the wand. The means for securing the wand to a vertical surface may comprise a suction cup adapted for coupling to an end of the telescoping wand.

In another aspect, the invention includes the telescoping wand described above wherein the wand comprises three sections, the first section having a diameter greater than the diameter of the other two sections and being substantially rigid in a longitudinal direction for receiving the other two sections in concentric alignment therewithin. The second section of the wand has a substantially thick wall construction and longitudinal rigidity for supporting the third section outwardly thereof. The third section is relatively narrow in cross-section and resilient for facilitating flexibility and the suspension of the pet interaction object therebeneath. The tether may be either an elastic or inelastic filament, depending on the application.

In yet another aspect, the invention includes the aforesaid wand and a bell adapted for securement to the distal end thereof. The pet interaction object comprises a relatively large stuffed object having an exterior of fur. The telescoping wand also comprises three telescoping sections, the outermost section of which is of solid construction manifesting resilient flexibility and formed with an aperture on the outer end thereof adapted for receipt of the tether therethrough for the securement to the wand. The telescoping wand further comprises an enlarged base segment having substantially thick wall construction and longitudinal rigidity for support of the outwardly telescoping sections. The end opposite the telescoping sections is formed with a threaded aperture adapted for the securement of a suction cup thereto.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figures 1, 2, 3:
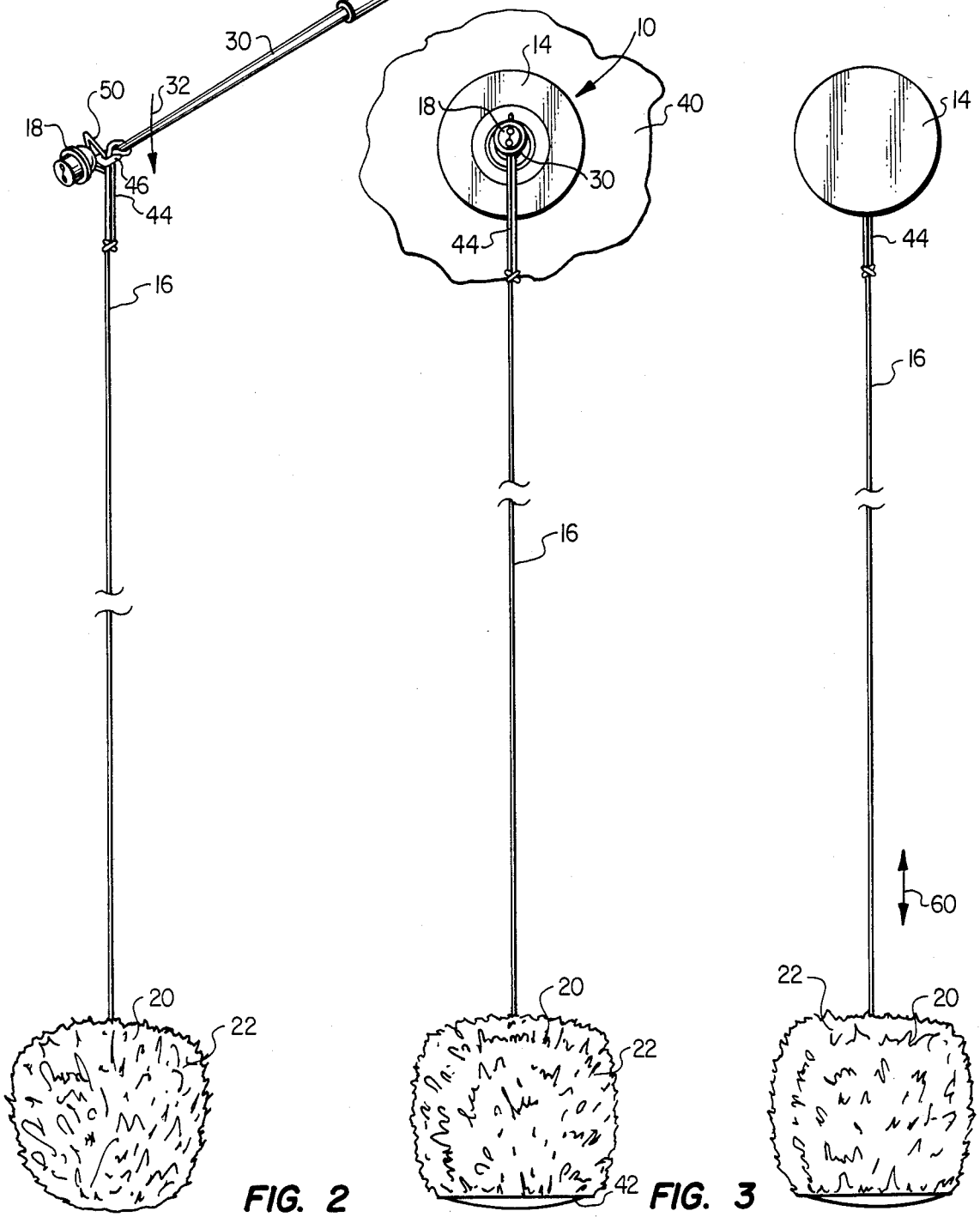
FIG. 1 is a perspective view of the expandable wand pet toy of the present invention.
FIG. 2 is a front elevational view of the expandable wand of FIG. 1.
FIG. 3 is a rear elevational view of the expandable wand pet toy of FIG. 1.

Referring first to FIG. 1 there is shown a perspective view of the expandable wand pet toy of the present invention. The wand 10 is comprised of a telescoping handle section 12 having a suction cup 14 disposed on a first end and a tether 16 secured to a second opposite end. A bell 18 is likewise secured to the upper region of the tether and distal end of the wand 12. A pet toy 20 is secured to the lower end of the tether 16 for interaction with the pet.

Still referring to FIG. 1 the toy 20 preferably is constructed of a furry body section 22 for "teasing" a pet such as a cat. The tether 16 may be elastic or a standard substantially inelastic filament depending on the particular pet for whom the toy is designed. The bell 18 is of conventional design for making an audible sound to further interest the pet during interaction.

Still referring to FIG. 1, the wand is preferably constructed of three body sections, the first two of which are hollow and substantially rigid in a longitudinal direction. The first or base body section 24 is constructed with substantially thick walls and adapted for the telescoping receipt of the extension sections of the wand. The base end 26 of the section 24 is constructed for receipt of a conventional plug or tip (not shown) or the attachment of the suction cup 14 as is shown. The suction cup and wand are preferably formed of plastic (such as polypropylene) through conventional molding techniques.

Referring still to FIG. 1, the wand 12 is constructed with the second handle section 28 also formed of substantially thick wall construction and in substantially rigid longitudinal configuration adapted for slidable receipt within base section 24 adapted for slidable receipt within base section 24. The end section 30 of the wand 12 is constructed of substantially solid cross-section and of sufficient flexibility for allowing bending thereof in the direction of arrow 32. The bending direction of arrow 32 can occur during pet interaction which will also cause the bell 18 to produce audible noises for teasing the animal and maintaining its interest.

Referring now to FIG. 2 there is shown the pet toy 10 secured to a wall 40. The suction cup 14 is mounted upon wall section 40 in a conventional pressure suction manner. The tether 16 depends from the distal end of the flexible wand region 30 with the bell 18 clearly shown thereon. The furry surface 22 of the cat toy 20 is shown in this particular configuration to have a rather smooth lower body portion 42 for engagement with the floor or other hard surface area. The tether 16 is shown to be tied in a loop configuration 44 after extension through an eye or aperture 46 formed in the distal end of the wand 12 as shown in FIG. 1.

Referring now to FIG. 3 there is shown the suction cup 14 from a rear elevational view with the tether 16 depending therefrom and the loop end 44 connected to the wand 12. The rear view of the cat toy 20 is seen to be substantially identical to the other views thereof. In accordance with the principles of the present invention, the cat toy 20 can comprise any shape, size or configuration deemed appropriate and may include facial features such as eyes, nose and a mouth and/or the configuration of an animal such as a mouse. The fur 22 referred to herein is preferably of a synthetic variety, of a non-toxic nature for appropriate animal interaction, such as "chewing", and preferably of the variety which is not easily torn or disengaged from the body portion 20.

In operation the cat toy 10 is preferably collapsed in a small package with the three telescoping sections 24, 28 and 30 received one within the other. The tether 16 can be wrapped around the base member 24 with the cat toy body 20 provided adjacent thereto. During use the cat toy wand is extended in the configuration shown in FIG. 1 and the bell 18 may be secured thereto and by the utilization of a conventional clip 50 such as that also shown in FIG. 1. It may likewise simply be tied in the loop section 44 of tether 16. The flexibility of the small wand section 30 affords the advantageous movement in direction of arrow 32 of the cat toy 20 during pet interaction. With the cat, animal interaction produces much deflection of the wand itself and the structural rigidity of the handle region 24 and 28 prevent the disengagement of suction 14 from the wall section 40 as shown in FIG. 2. The longitudinal rigidity of the handle sections 24 and 28 likewise facilitate the use of the wand 10 by a user in playing with an animal such as a cat or dog as well as the placement upon a smooth surface 40 such as a refrigerator or glass window or tile surface as shown to be most appropriate in view of the fact that conventional suction cups are best mounted to non-porous, substantially smooth areas. The utilization of elastomeric tether 16 likewise produces much more reciprocal actuation and bouncing of the cat toy body 20 in the direction of arrow 60 shown in FIG. 3. The up and down motion of arrow 60 is useful in taunting a cat for encouraging play. With the suction 14 mounted to a smooth surface such as a refrigerator door or window, a cat can be induced to play "by itself" for prolonged period of time with much enjoyment.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. A pet toy comprising:
    a telescoping wand including first, second and third telescoping sections adapted for retraction one into the other for storage and expansion one from the other;
    said first section of said wand having a diameter greater than the diameter of the other two sections and being substantially rigid in a longitudinal direction for providing structural rigidity to said wand structure and adapted for receiving said other two sections in concentric alignment therewithin;
    said second section of said wand having a substantially thick wall construction, formed of material substantially similar to that of said first section, and having longitudinal rigidity for supporting said third section outwardly thereof;
    said third section of said wand being relatively narrow in cross-section, of resilient flexibility for facilitating the suspension of said pet interaction object therebeneath and formed of material substantially similar to that of said first section;
    said third section of said wand being of solid construction manifesting resilient flexibility and formed with an aperture on the outer end thereof adapted for receipt of said elastic tether therethrough for securement to said wand;

means for mounting said first section of said wand to a vertical surface;

a pet interaction object suspended from a distal end of said wand; and an elastic tether secured to said distal end of said wand and to said object for providing movement of said pet interaction by the elasticity of said tether and said flexibility of said wand.

2. The apparatus as set forth in claim 1 wherein said means for securing said wand to a vertical surface comprises a suction cup adapted for coupling to an end of said telescoping wand.

3. The apparatus as set forth in claim 1 and further including a bell adapted for securement to said distal end of said wand.

4. The apparatus as set forth in claim 1 wherein said pet interaction object comprises a relatively large stuffed object having a fur exterior.

5. The apparatus as set forth in claim 1 wherein said surface mounting means comprises a suction cup, said cup having a threaded outer region adapted for threaded engagement with said wand, said suction cup having an outside diameter substantially greater than said diameter of said wand.

* * * * *